March 23, 1937.  G. F. GERDTS  2,074,690
STEAM TRAP
Filed Jan. 10, 1934
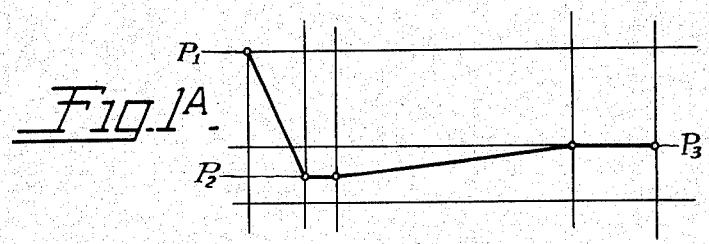
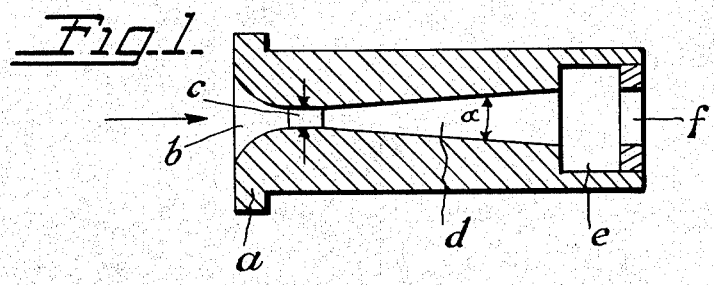
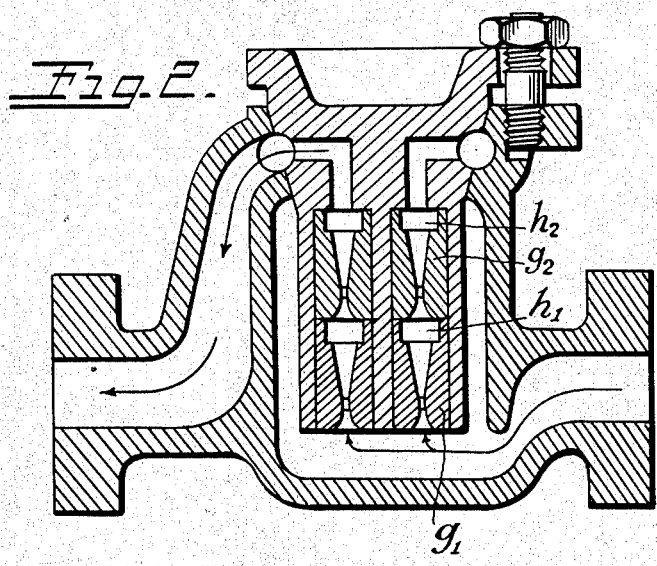
Inventor
G. F. Gerdts
By Alfred D. Elder
Attorney.

Patented Mar. 23, 1937

2,074,690

UNITED STATES PATENT OFFICE 2,074,690

STEAM TRAP

Gustav Friedrich Gerdts, Bremen, Germany

Application January 10, 1934, Serial No. 706,106
In Germany January 14, 1933

1 Claim. (Cl. 137—103)

My invention relates to steam traps or devices by means of which the water of condensation is withdrawn from containers under pressure, generally through a small valve or slide, or an expandible member, opening and closing according to the flow of the condensate.

Such small valves and slides, being subjected to considerable wear due to the high velocity of the stream, are only too liable to soon cause a serious continuous loss of steam, as is well understood. Further, a disadvantage of steam traps with floats is the great loss of heat through radiation caused by the inevitably large sized housing.

The efforts to produce reliably operating steam traps with actuated valves not having produced satisfactory results, devices with throttling channels of different forms came then in use which however required a more or less constant inflow of the condensate and careful adjustments, to ensure satisfactory operation.

Fluctuations of the inflow cause almost invariably choking, or allow steam to blow through if the area of flow in the system of channels for passing the condensate remains constant, being in that case either too small or too large.

In the improved steam trap, one or more channels are employed for passing the condensate, however these do not consist any longer of more or less arbitrarily arranged, alternately successive narrow or wider channels of whatever form, but are, according to the invention, constructed on lines and in a manner adaptable to satisfactorily taking care of all inflow fluctuations, indeed to a surprising extent.

Such channels resembling nozzles can be used singly or in groups, connected in series or in parallel, placed in or on plates, cylindrical or conical bodies, or bodies of other shape, also in halves or otherwise in sections.

In the accompanying drawing, Figure 1 is a longitudinal section of a steam trap channel according to the invention, connected with a corresponding pressure diagram Fig. 1A, and Figure 2 is a section of a steam trap comprising a number of such channels connected in multiple series.

Referring now to Figure 1, $a$ is a cylindrical body with a channel comprising a funnel-shaped inlet section $b$, a short narrow section $c$, a long tapering section $d$, a short cylindrical section $e$ of a diameter larger than that of all other sections, and an outlet section $f$.

The pressure of the condensate is reduced in section $c$ to or near to a vacuum, the velocity increasing therethrough accordingly. A good part of this pressure drop is restored however in tapering section $d$ through the diffusory effect won by making the nozzle-angle or conicity very small, for instance less than 10°, to thereby prevent any whirls or cross currents which tend to delete or allay the diffusory effect.

The channel according to the invention is thus formed primarily to ensure in section $d$ a homogenous stream, i. e. a flow without any eddies, so that as a result the pressure in the narrowest section $c$ is considerably below that at the outlet, from which follows, that section $d$ is not an expansion—but a compression chamber.

The action of the improved steam trap is as follows:—

If the condensate enters the steam trap at a pressure of about 8 atmospheres the pressure in the narrowest section $c$ will then practically be a vacuum, though there is atmospheric pressure at the outlet, if a discharge into the open is desired. Thus there is an increase of the pressure in tapering section $d$ due to the diffusory effect mainly in consequence of the stream being in section $d$ free from whirls or eddy currents.

The vacuum produced in section $c$ according to the invention, causes a violent vapourization of the water, also at temperatures below 100° C. The hotter the condensate, the more heat is available for vapourization and the larger will be the quantity of the vapour, the same taking up ever so much more space than the condensate, so that the capacity of the channel for passing condensate is in consequence quite materially reduced if the condensate is hot.

On the other hand, if the condensate has a temperature of about 40° C. there is naturally hardly any vapourization and practically the full area of flow is available for passing the condensate. The capacity of a channel according to the invention thus varies quite considerably and with the temperature of the inflowing condensate, similar to the performance in a steam trap having an expandible member which holds the valve wide open when the temperature of the condensate is low but throttles the flow at higher temperatures.

The condensate being very hot when it flows into the trap in small quantities, it can not cool perceptibly as it is always in contact with the steam, the capacity for passing condensate is therefore slight when the quantity of the condensate is slight. If however the condensate flows in cold, not receiving any heat from the steam, the pipe line is choked in consequence.

The capacity of the channel increases with the inflow of the condensate, so that also the large quantities of the same unavoidably present when starting the fire are automatically passed off without a hitch.

The channel according to the invention thus accommodates itself automatically to the fluctuations in the quantity of the condensate by reason of allowing the vapourization effect in the same to be best adapted to the purpose aimed at. If the inflow of condensate is small, the capacity is small and if the inflow is large, the capacity is correspondingly large. As determined experimentally, the increase in capacity is especially great when cold water flows into the trap, and amounts in such a case to about from 5 to 6 times that if hot condensate flows in.

Since in all cases the channel is either filled with condensate or with condensate vapour, live steam can not escape. A system of channels according to the invention then takes care of all fluctuations in a manner which makes loss of steam impossible for discharges greater than a given minimum.

The diagram in Figure 1A clearly shows the pressures in the different sections of the channel, that in the narrowest part, $p_2$, being lowest, rising again in tapering section, $p_3$, due to diffusory effect.

Figure 2 shows a form of the invention in which a number of the channels are connected in series and also in parallel in separate cylindrical bodies $g_1$, $g_2$. The channels may also be pressed, et cetera, into plates or other bodies, in series or in parallel, so that a number of these suitably combined form a system of connected channels. In Figure 2 are also shown, inserted into the channels resembling nozzles, larger expansion chambers $h_1$, $h_2$, et cetera, which do not in any way hinder the passage of the condensate.

If only steam enters the system of channels, which for instance is the case when there is no condensate flowing in, the steam expands and whirls, to be throttled in the following channels according to the invention. Through this alternately successive expanding and throttling action the steam loses its penetrating force and is prevented from escaping, also if there is no condensate entering.

Such an expansion chamber can also be used on a single channel, as shown in Figure 1. Section $d$ is followed by a wider section $e$ having a partition $f$ with an opening the area of which is for instance equivalent to that of the outlet of section $d$.

Having thus described my invention, I claim:—

A steam trap for condensate having a nozzle comprising a relatively short funnel-shaped inlet section, a long gradually flaring main section in which the pressure of the condensate is increased, a comparatively short section of reduced cross section, one end of which merges into the inlet section and the other end merges into the main section, an outlet with a flow passage cross sectional area about equal to that of the largest cross sectional area of the flaring section, and an enlarged cylindrical section between the main section and the outlet having a diameter greater than that of either the adjacent end of the main section or the outlet; said enlarged cylindrical section forming a whirl chamber for the condensate, and said reduced short section being adapted to produce a partial vacuum by flow of the condensate therethrough.

GUSTAV FRIEDRICH GERDTS.